(12) United States Patent
Paterson et al.

(10) Patent No.: US 11,733,833 B2
(45) Date of Patent: Aug. 22, 2023

(54) SYSTEMS AND METHODS FOR LEGAL RESEARCH NAVIGATION

(71) Applicants: David Thomas Paterson, Edinburgh (GB); Erica Gann Kitaev, Denver, CO (US); Michael Eng Poh Clark, Essex (GB); Megan Anne Sramek, New York, NY (US); Deacon Ales, Burnsville, MN (US); Emily Colbert, Garden City, NY (US)

(72) Inventors: David Thomas Paterson, Edinburgh (GB); Erica Gann Kitaev, Denver, CO (US); Michael Eng Poh Clark, Essex (GB); Megan Anne Sramek, New York, NY (US); Deacon Ales, Burnsville, MN (US); Emily Colbert, Garden City, NY (US)

(73) Assignee: Thomson Reuters Enterprise Centre GmbH, Zug (CH)

( * ) Notice: Subject to any disclaimer, the term of this patent is extended or adjusted under 35 U.S.C. 154(b) by 0 days.

(21) Appl. No.: 17/528,303

(22) Filed: Nov. 17, 2021

(65) Prior Publication Data
US 2022/0155917 A1 May 19, 2022

Related U.S. Application Data

(60) Provisional application No. 63/114,795, filed on Nov. 17, 2020.

(51) Int. Cl.
*G06F 3/048* (2013.01)
*G06F 3/0482* (2013.01)
*G06F 16/248* (2019.01)
*G06F 3/0484* (2022.01)

(52) U.S. Cl.
CPC .......... *G06F 3/0482* (2013.01); *G06F 3/0484* (2013.01); *G06F 16/248* (2019.01)

(58) Field of Classification Search
CPC ..... G06F 3/0482; G06F 16/248; G06F 3/0484
See application file for complete search history.

(56) References Cited

U.S. PATENT DOCUMENTS 8,577,911 B1 * 11/2013 Stepinski ............ G06F 16/3325
707/765
8,584,047 B2 * 11/2013 Athans .................. G06F 3/0481
715/713

(Continued)

OTHER PUBLICATIONS

Rusu et al., Real-time Interactive Visualization of Information Hierarchies, 2007, IEEE, 7 pages.*

(Continued)

*Primary Examiner* — Linh K Pham
(74) *Attorney, Agent, or Firm* — Antonio Papageorgiou; Lombard & Geliebter LLP

(57) ABSTRACT

Computer systems and corresponding methods are provided for computer assisted research in a network are provided that generate interface screens that include a map view of a plurality of selectable objects disposed in a nuclear arrangement in segmented rings about a first level object. The computing device is configured to receive selections of the displayed objects and expand the display to include additional segmented levels all surrounding the first level object.

16 Claims, 13 Drawing Sheets

(56) References Cited

U.S. PATENT DOCUMENTS

| | | | |
|---|---|---|---|
| 8,683,344 B2* | 3/2014 | Falkenberg | G06Q 10/10 |
| | | | 715/810 |
| 9,891,801 B2* | 2/2018 | Roesch | G06T 11/206 |
| 10,997,244 B2* | 5/2021 | Russell | G06F 21/56 |
| 2007/0074252 A1* | 3/2007 | Nazarian | H04N 21/4821 |
| | | | 725/35 |
| 2007/0180408 A1* | 8/2007 | Rusu | G06F 16/957 |
| | | | 707/E17.119 |
| 2007/0226640 A1* | 9/2007 | Holbrook | G06F 16/951 |
| | | | 715/765 |
| 2011/0047014 A1 | 2/2011 | De Angelo | |
| 2011/0219324 A1 | 9/2011 | Watanabe | |
| 2012/0240064 A1 | 9/2012 | Ramsay | |
| 2013/0151509 A1* | 6/2013 | Tran | G06F 16/9577 |
| | | | 707/723 |
| 2013/0339904 A1* | 12/2013 | Geithner | G06F 3/0488 |
| | | | 715/834 |
| 2019/0018904 A1* | 1/2019 | Russell | G06F 16/27 |

OTHER PUBLICATIONS

Yee et al., Animated Exploration of Dynamic Graphs with Radial Layout, 2001, IEEE, 8 pages.*

PCT International Search Report and Written Opinion for International Application No. PCT/US21/59608, dated Feb. 7, 2022, 6 pages.

International Preliminary Report on Patentability and Written Opinion of the International Search Authority, dated May 16, 2023 (PCT Appl. No. PCT/US2021/059608 (5 pages).

* cited by examiner

SYSTEMS AND METHODS FOR LEGAL RESEARCH NAVIGATION

RELATED APPLICATION

This application claims the benefit of U.S. Provisional Patent Application No. 63/114,795, filed on Nov. 17, 2020, which is hereby incorporated herein by reference.

1. COPYRIGHT NOTICE

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

The present application relates to systems and methods for legal and other types of computer-assisted research, and more particularly interface screens generated therewith that facilitate the discovery of relevant documents from a collection of documents in a computer network environment.

General and specialty computer research platforms are known. Westlaw®, for example, is an online legal research service and proprietary database legal professionals, which includes more than 40,000 databases of case law, state and federal statutes, administrative codes, newspaper and magazine articles, public records, law journals, law reviews, treatises, legal forms, and other information resources. Research in such a vast collection of documents can be a daunting, if not an impossible task absent appropriate controls. Westlaw®, for example, provides several ways for users to navigate through this collection for users to locate relevant content. For example, the platform provides a search interface that allows users to enter terms for a natural language or Boolean queries, and to further refine the search results, for example, by content type, such as cases, statutes, secondary sources, key numbers, etc. A high level search, however, can return well over 100,000 documents in over 15 content types. Another approach is for users to search using the hierarchical West Key Number System taxonomy. Westlaw's® Practical Law service provides categorized resources based on practice areas, which provide up-to-date checklists, overview of legal topics, etc. These "flat" lists, however, do not allow users to easily explore beyond that which is displayed on the list. Moreover, even in "list" form, the results may contain thousands of objects that can still be unwieldy to navigate.

Accordingly, there is a need for computer systems and corresponding methods that provide a better human-machine interface with respect to navigating collections of documents and other resources for legal and other types of computer-assisted research.

SUMMARY

In one aspect, a method for computer assisted research in a network environment is provided that includes receiving, by a computing device, a selection of a first level object from a plurality of first level objects; and causing to be displayed, by the computing device, in response to the selection of the first level object, an interface screen includes the selected first level object and a plurality of second level objects related to the first object, the plurality of second level objects arranged in a segmented ring around the selected first level object.

In one embodiment, each of the second level objects are selectable, the method further includes expanding, by the computing device, the interface screen in response to a selection of a second level object to include a plurality of third level objects arranged in a segmented ring around the first level object and around the segmented ring of second level objects.

In one embodiment, the interface screen is infinitely scalable.

In one embodiment, each of the third level objects are selectable, the method further includes expanding, by the computing device, the interface screen in response to a selection of a second level object to include a plurality of fourth level objects arranged in a segmented ring around the first level object and around the segmented rings of second and third level objects.

In one embodiment, the segmented rings are implemented in a circular design with the segmented rings of the second and third level objects arranged concentrically about the first level object.

In one embodiment, the objects each relate to a knowledge resource.

In one embodiment, the segmented ring includes a plurality of segments each relating to a different type of resource.

In one embodiment, the plurality of segments relate to at least two types of resources selected from a group consisting of topics, practice notes, standard documents, checklists, articles, and toolkits.

In one embodiment, each of the second level objects are selectable, the interface includes a form element for users to enter query terms and a query results window, the method further includes expanding, by the computing device, the interface screen in response to a selection of a second level object to include a plurality of third level objects arranged in a segmented ring around the first level object and around the segmented ring of second level objects, and retrieving, by the computing device, search results based on query terms and displaying the search results in the query result window.

In one embodiment, the search results related to the first, second, and third level objects.

In one embodiment, each of the second level objects are selectable, the method further includes expanding, by the computing device, the interface screen in response to a selection of a second level object to include a plurality of third level objects arranged in a segmented ring around the first level object and around the segmented ring of second level objects, and zooming in in the interface screen so that the entirety of the selected second level object and the segmented ring associated with the third level objects.

In one embodiment, each of the second level objects are selectable, the method further includes expanding, by the computing device, the interface screen in response to a selection of a second level object to include a plurality of third level objects arranged in a segmented ring around the first level object and around the segmented ring of second level objects, and displaying a segment associated with the selected second level object and the segmented ring associated with the third level objects in a contrasting color to indicate navigation path.

In one embodiment, each of the second level objects are selectable, the method further includes expanding, by the computing device, the interface screen in response to a selection of a second level object to include a plurality of third level objects arranged in a segmented ring around the first level object and around the segmented ring of second level objects, and displaying content associated with the selected second level object.

In one embodiment, the content associated with the selected second level object includes at least one link to an object displayed on the interface screen, the method further includes receiving a selection of the at least one link, navigating to the object associated with at least one link, and displaying content associated with the selected link.

In one embodiment, the method includes refocusing the interface screen onto the object associated with at least one link.

In one embodiment, each of the second level objects are selectable, the method further includes expanding, by the computing device, the interface screen in response to a selection of a second level object to include a plurality of third level objects arranged in a segmented ring around the first level object and around the segmented ring of second level objects, and wherein the second level objects and the third level objects share at least one object in common.

In one embodiment, each of the second level objects are selectable, the method further includes expanding, by the computing device, the interface screen in response to a selection of a second level object to include a plurality of third level objects arranged in a segmented ring around the first level object and around the segmented ring of second level objects, and wherein the segmented ring around the second level objects and the third level objects each include a plurality of segments relating to a resource type and wherein at least one of the plurality of segments associated with the second level objects and at least one of the plurality of segments associated with the third level objects share at a resource type in common.

Additional aspects of the present invention will be apparent in view of the description which follows.

DETAILED DESCRIPTION

The present application provides computer systems and corresponding methods that overcome one or more of the limitations associated with prior computer-assisted research systems. That is, the systems herein provide one or more interface screens that present related resources graphically in a manner that improves the human-machine interface, such that computer-assisted research is made easier, more efficient, and/or more reliable than existing technology. The interface beneficially depicts relationships between objects that may not be apparent or may have been missed with other systems, therewith providing a more complete picture of the matter and the issues for the user.

More specifically, systems, methods, and interface screens generated therewith are provided that facilitate exploration of single-to-multiple object connections. Preferably, the interface screen presents resources in a circular, nuclear design from which additional segments can be expanded for users to explore additional connections related to the preceding object. Preferably, the interface when executed provides resources discoverable in an expanding segment branching method as a navigable, single page experience. This presentation of resource objects enables multiple levels of connections to be discovered in a scalable model, as discussed in greater detail below, allowing users to discover a larger set of and deeper connections that would otherwise not be available in a "flat" list or lists. Although the systems may be discussed herein in relation to knowledge management systems, such as Westlaw's® Practical Law Service, it is understood that the concepts disclosed herein are equally usable for navigating objects in other contexts, including without limitation social media platforms and other information publishing systems.

Figure 1:
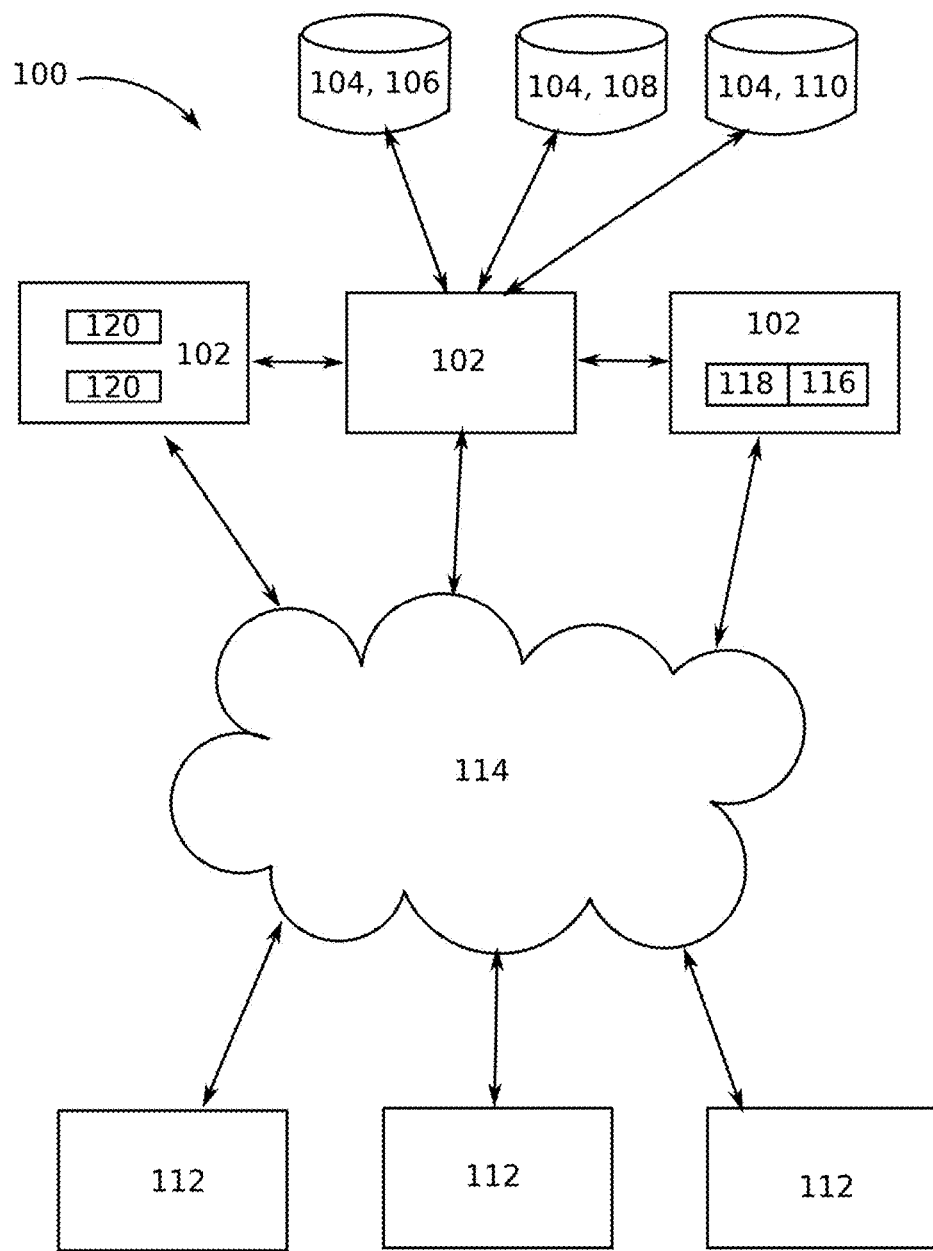
FIG. 1 a block diagram of a system for the computer assisted research according to at least one embodiment of the systems disclosed herein.

FIG. 1 shows an exemplary computer system configured to provide the functionality disclosed herein, including generating one or various interface screens for legal and other types of research. In one embodiment, the system 100 includes one or more servers 102, coupled to one or a plurality of databases 104, such as primary materials databases 106, secondary materials databases 108, resource databases 110, etc., as well as metadata associated with this material and user account information. The servers 102 may further be coupled over a communication network 114 to one or more client devices 112. Moreover, the servers 102 may be communicatively coupled to each other directly or via the communication network 114.

The primary materials databases 106, in the exemplary embodiment, include a case law database(s) and a statutes database(s), which respectively include judicial opinions and statutes from one or more local, state, federal, and/or international jurisdictions. Secondary databases 108, contain legal documents of secondary legal authority, such as an ALR (American Law Reports) database, an AMJUR database, a West Key Number (KNUM) Classification database, and a law review (LREV) database. Resource database(s) 110 may include practice resources, such as practice notes, articles or other publications, standard documents, checklists, toolkits, etc. The various databases may be related with metadata, such as with one or more hierarchical taxonomies, tags or labels, case law and statutory citation relationships, quotation data, headnote assignment data, etc. The user account information may store navigation history, allowing users to return to searches and/or retrieve objects as desired.

The servers 102 may vary widely in configuration or capabilities, but are preferably special-purpose digital computing devices that include at least one or more central processing units 116 and computer memory 118. The server(s) 102 may also include one or more of mass storage devices, power supplies, wired or wireless network interfaces, input/output interfaces, and operating systems, such as Windows Server, Unix, Linux, or the like. In an example embodiment, server(s) 102 include or have access to computer memory 118 storing instructions or applications 120 for the performance of the various functions and processes disclosed herein, including causing the interface screen or screens discussed herein to be displayed at the client device(s) 112. The servers 102 may further include one or more search engines and a related interface component, for receiving and processing queries and presenting the results thereof to users accessing the service via client devices 112. The interface components generate web-based user interfaces, such as a search interface with form elements for receiving queries, a results window for displaying the results of the queries, as well as various interfaces or windows with selectable elements therein for navigating the objects that are the result of the queries and/or resource objects generally, as discussed below.

The computer memory may be any tangible computer readable medium, including random access memory (RAM), a read only memory (ROM), a removable storage unit (e.g., a magnetic or optical disc, flash memory device, or the like), a hard disk, or etc.

The client devices 112 may include a personal computer, workstation, personal digital assistant, mobile telephone, or any other device capable of providing an effective user interface based on content served by the server and/or database. Specifically, client device 112 includes one or more processors, a memory, a display, a keyboard, a graphical pointer or selector, etc. The client device memory preferably includes a browser application for displaying interfaces generated by the servers 102. The interface screens may be generated by the servers 102 for display at the client device(s) 112 with code, such as JavaScript, to the client device(s) 112 that enables asynchronous exchange of information with the servers 102 for the single interface experience noted above. That is, information displayed on the screen may be updated without needing to refresh the page, including updating the interface with respect to expanding object connections in response to user selection of any given object.

Figure 2:
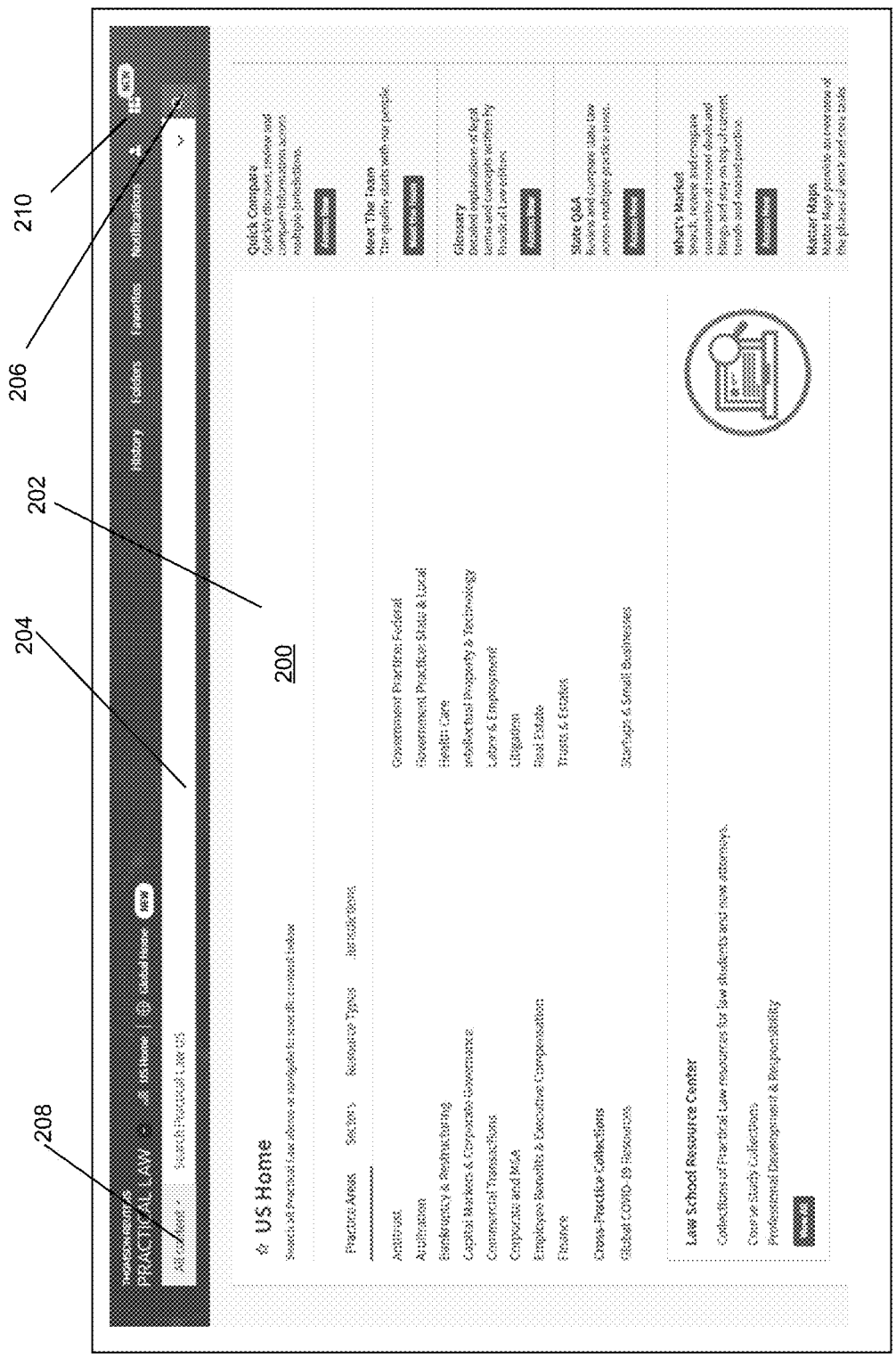
FIGS. 2-11 are various embodiments of graphic interface screens generated by the systems and methods disclosed herein.

Referring to FIG. 2, an exemplary knowledge management system landing page 200 is shown. Westlaw's® Practical Law home page, for example, includes a window 202 with navigable elements, such as hyperlinks, buttons, etc., therein for users to navigate the various resources maintained by the system. The service may require user credentials for access and the credentials may be used to track user interaction with the system, including logging clicks, downloads, etc., for the user to return to previous research activity.

Practical Law resources are maintained by topic or practice area, sectors, resource types, jurisdictions, etc. In this regard, users may drill down to the desired resource from any one of these categories. For example, these categories may be provided in the navigation window 202 in the form of selectable tabs, as shown, that allow users to drill down each of the tab categories to identify the desired resources. That is, a user may begin with a first level in the hierarchy, e.g. "Practice Area", and drill down to a second level, e.g., "Antitrust" practice area, to a third level, e.g., "compliance", etc., until a list of resources are presented for user consumption. For example, a selectable list of resources sorted by type, such as practice notes, standard documents, checklists, articles, etc. related to the selected categories may be presented to the user. Similarly, the user may instead elect to start with "Resourced Types" as the first navigation level, followed by "Practice Notes", "Practice Area", "Antitrust", etc. to reach the same resource. The landing page 200 may further include form elements for users to enter terms for a query, such as a text box 204, search button 206, drop down menu 208, etc. In this regard, users are able to search the content maintained by the system using keywords. Preferably, the system provides a selectable icon 210 for users to access certain research tools.

Figure 3:
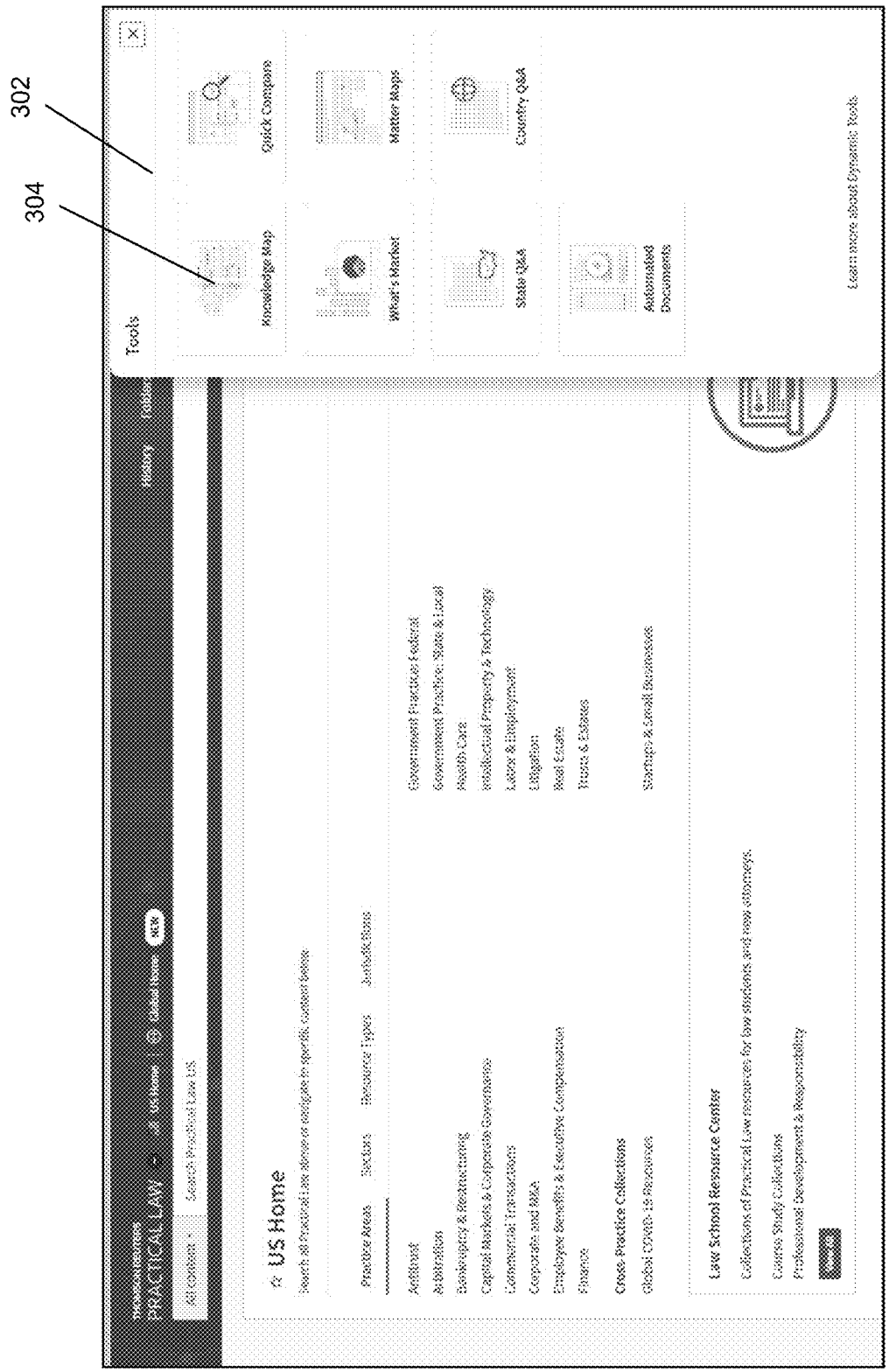
Figure 4A:
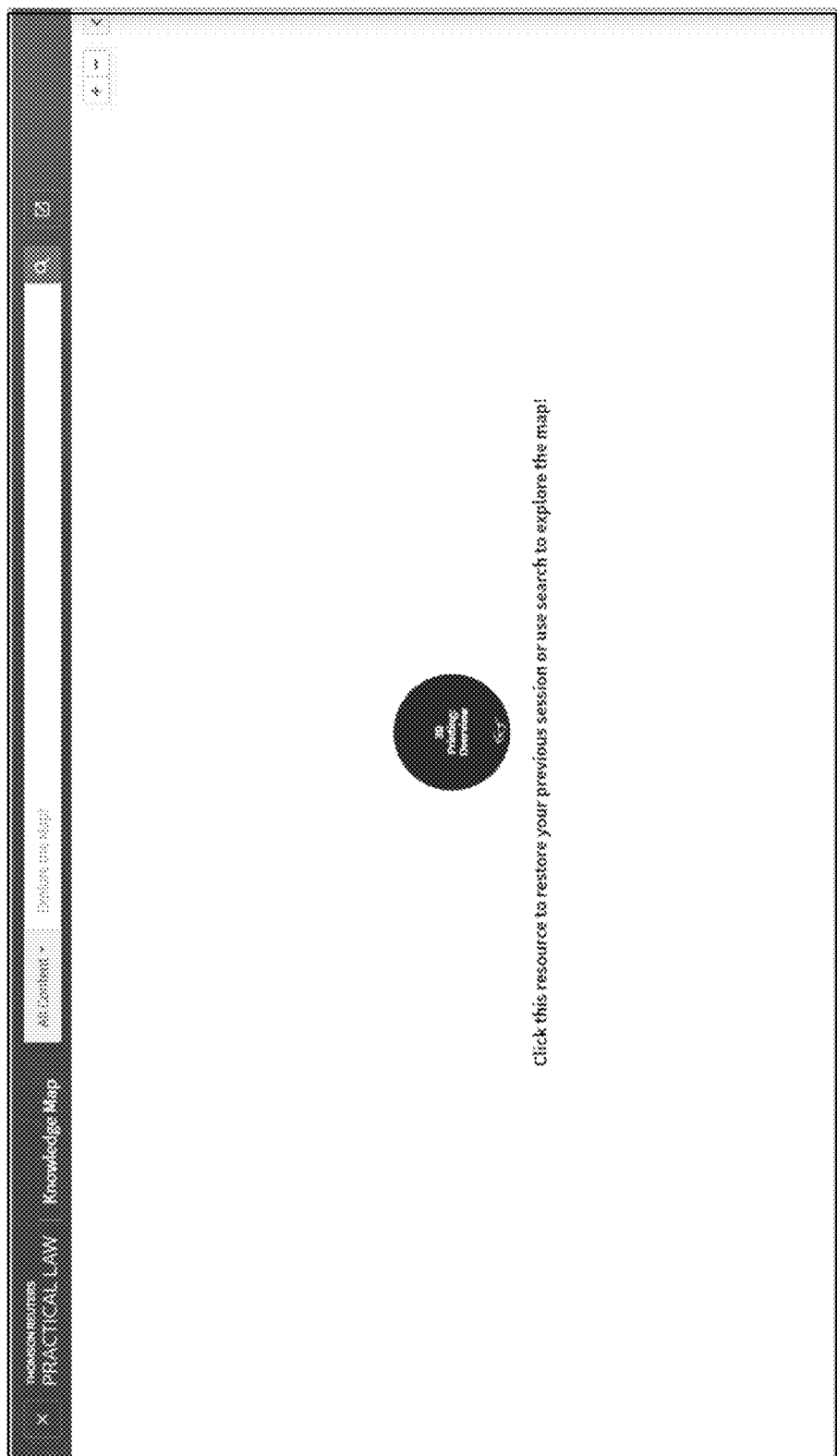
Figure 4B:
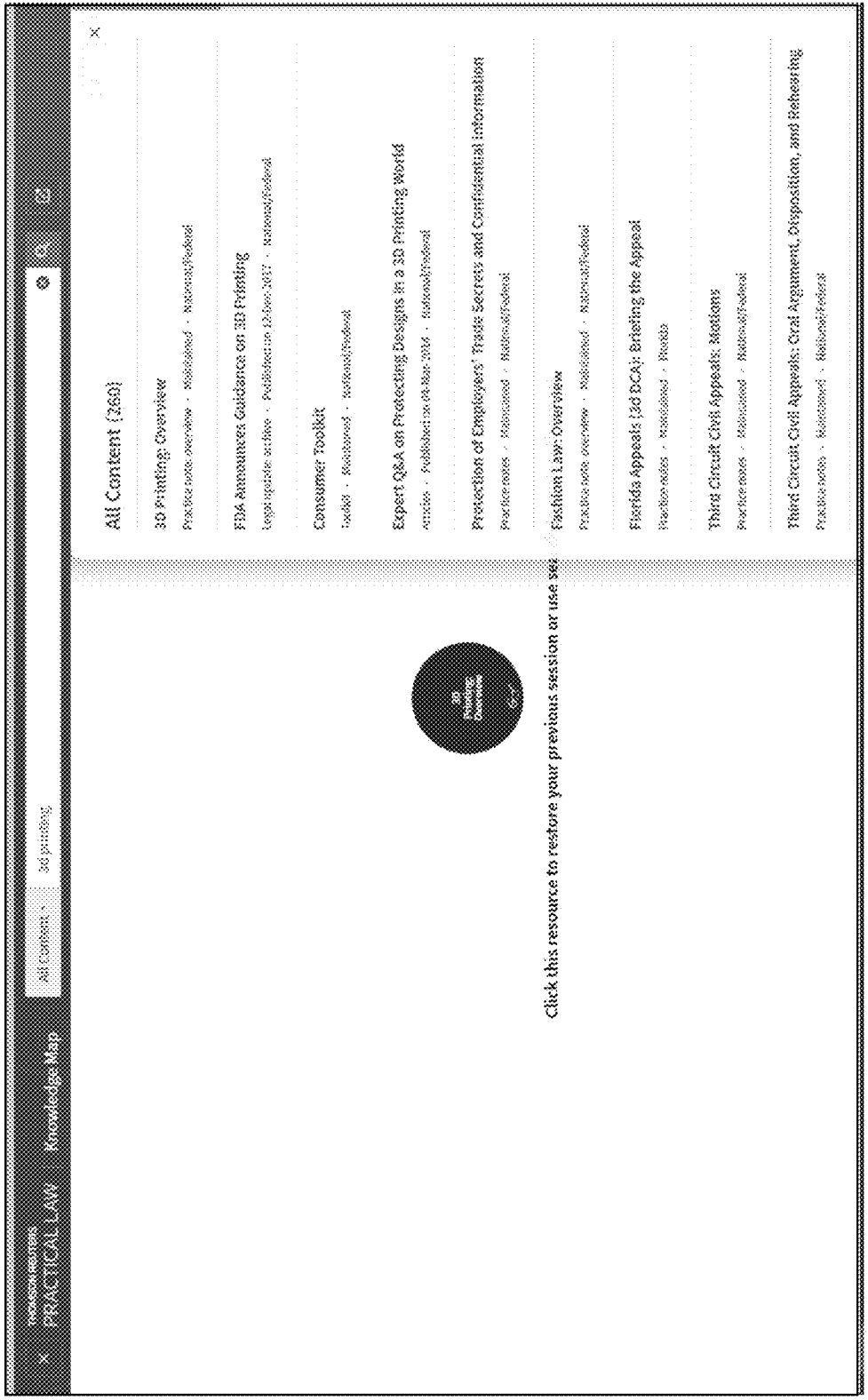

Referring to FIGS. 3 and 4A-B, when the tools icon 210 is selected, the tools window 302 may be presented that includes therein one or more selectable icons, such as a "knowledge map" icon as shown. The knowledge map icon when selected causes a landing screen 400 to be displayed that allows users to navigate resource objects visually, as discussed further below. The knowledge map interface screen 400 preferably includes form elements for a query, as discussed above, such as a text box 404, drop down list 408, button 406, etc. In this landing page, the user is presented with the option via a clickable icon or area 402 to return to the previous session or initiate a new session via the query elements 404-408. For example, a user may enter the search terms "3D Printing" in the text box 404, which will result in an overlay window 410 that includes a list of first level objects related to the query terms, such as "3D Printing: Overview", etc., as shown in FIG. 4B

Figure 5:
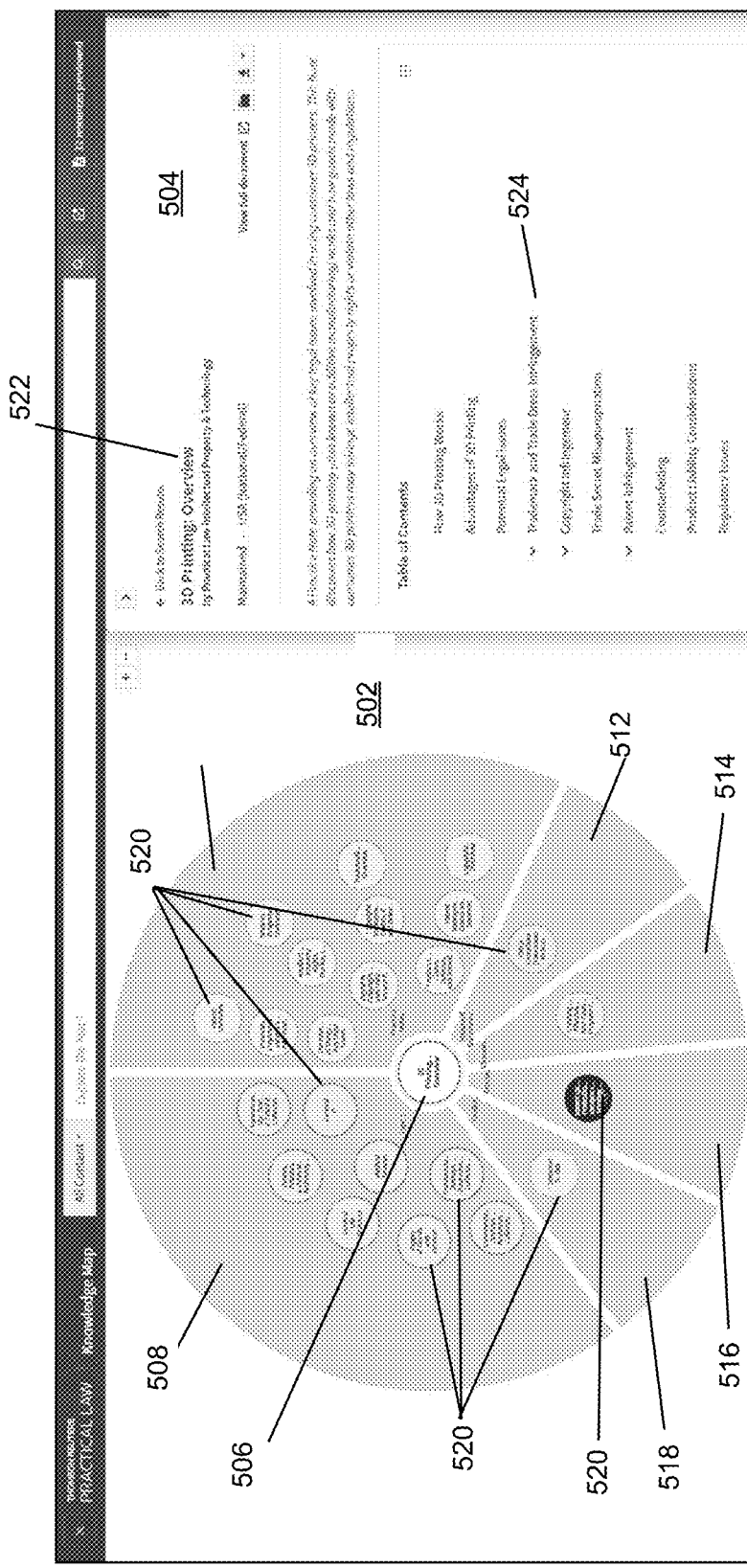

Referring to FIG. 5, a knowledge map interface screen is shown, which includes a map window 502 with the selected first level object "3d Printing: Overview" 506 presented centrally in a nuclear design with a plurality of second level objects 520, in a segmented ring 508-518 (collectively the second level segments) around the first level object 506. The segments preferably correspond to one of a plurality of resource types, such as topics 508, practice notes 510, standard documents 512, checklists 514, articles 516, and toolkits 518.

The map view preferably zooms into in the window 502 so that users can view the entirety of the first level object 506, and the second level segments and objects therein. Users are preferably provided with the capability of panning (dragging) and zooming in and out of the map. The knowledge map interface screen preferably includes a content viewer window 504, which displays the content associated with the selected resource object. In this instance, the selection of the "3d Printing: Overview" object results in the display of the associated content under that heading 522, which content may include a selectable table of content (TOC) 524 and other navigable elements therein, such as hyperlinks. The color or shading of the objects and/or segments displayed on the map may be coordinated to provide a visual indication of the user's navigation path. For example, a light color or hue may be used to indicate which of the objects or segmented rings are in focus, whereas a contrasting darker color or hue may indicate that the item has not been selected and thus not in focus. Visual cues may also be used to indicate objects that were previously visited, such as with a third contrasting color object. In FIG. 5, the lighter object 506 indicates that that resource object is in focus, whereas the darker second level segments indicates that those items are not selected or in focus. The "articles" object is shown in a darker color to indicate that the given article was previously viewed. Each of the second level objects 520 are preferably selectable to expand the map beyond the second level segments.

Figure 6:
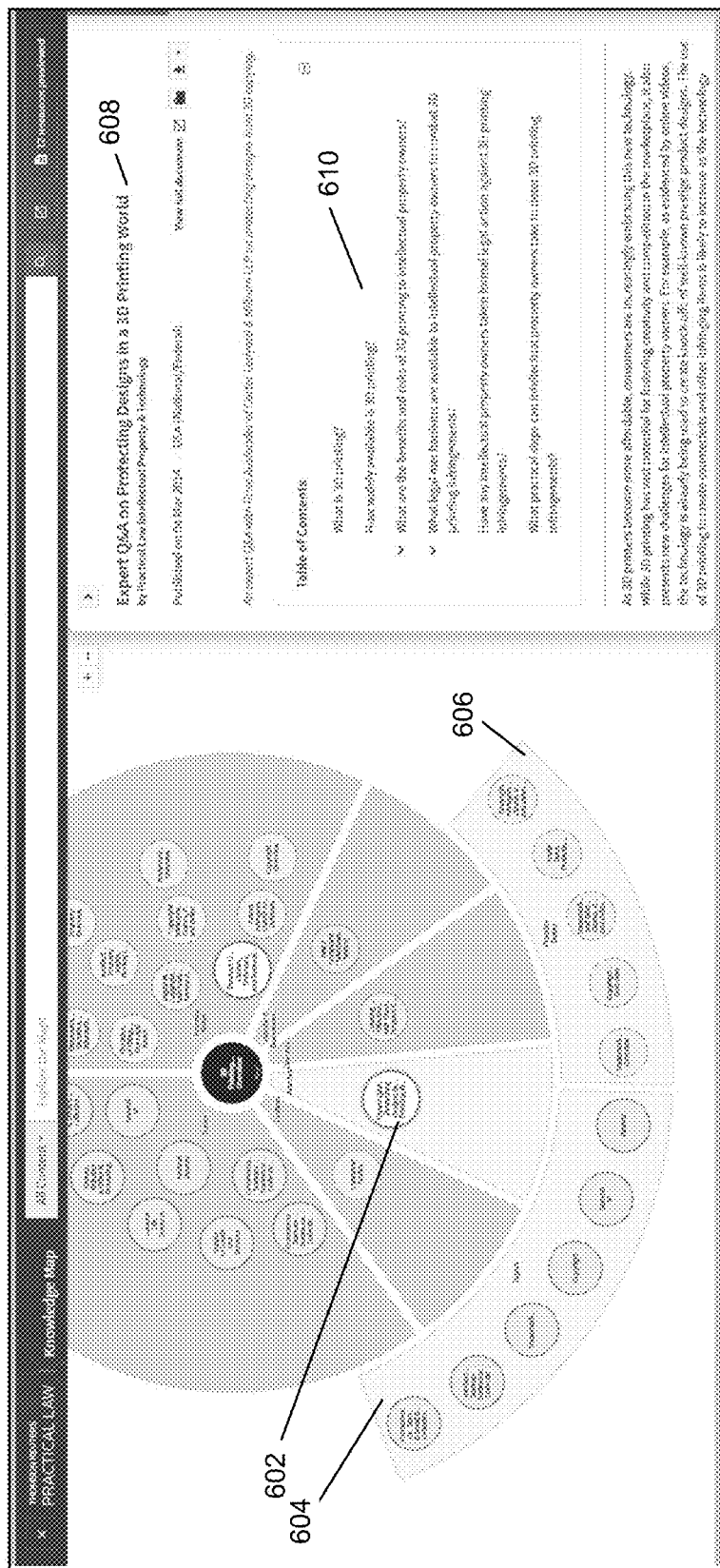

FIG. 6 shows the second level object articles 602 selected, which causes the map view to expand to include a third level segmented ring 604, 606 that includes objects therein related to the selected second level object 602. The second level segments may include resource types or even resource objects that are common at multiple segment levels, such one or more of topics 508, practice notes 510, standard documents 512, checklists 514, articles 516, and toolkits 518. As can be seen in this instance, the second and third level segments include topics and practice notes in common. Moreover, the topic segments at both levels include a General IP object. This arrangement of the objects allows users to observe connections with respect to single-multiple connection objects that would not be apparent with hierarchical navigation. As with the first level object, the content window may display the content associated with the selected second level object, in this case an article with TOC 610 relating to 3D printing 608. When the selected object includes a plurality of content items, a list of the content items may be presented in the content window 504 that allows the user to select and view the content items in the same or a separate window.

As can be seen, the map view depicts the first object in a dark color, indicating that the content item associated therewith has been viewed previously by the user and the second object 602 in a lighter color indicating that the second object 602 is in focus. Moreover, the third level segments are in a lighter color as well indicating similarly that this second-third level segment path is in focus. In this instance, the third level only includes objects associated with two segments, i.e., for topics 602 and practice notes 604, and the third level segment is therefore presented as a semicircular band. Preferably, selecting an object 602 automatically recenters and/or resets the zoom of the expanded map to display at least the selected object 602 and the next level segments, as shown.

Figure 7:
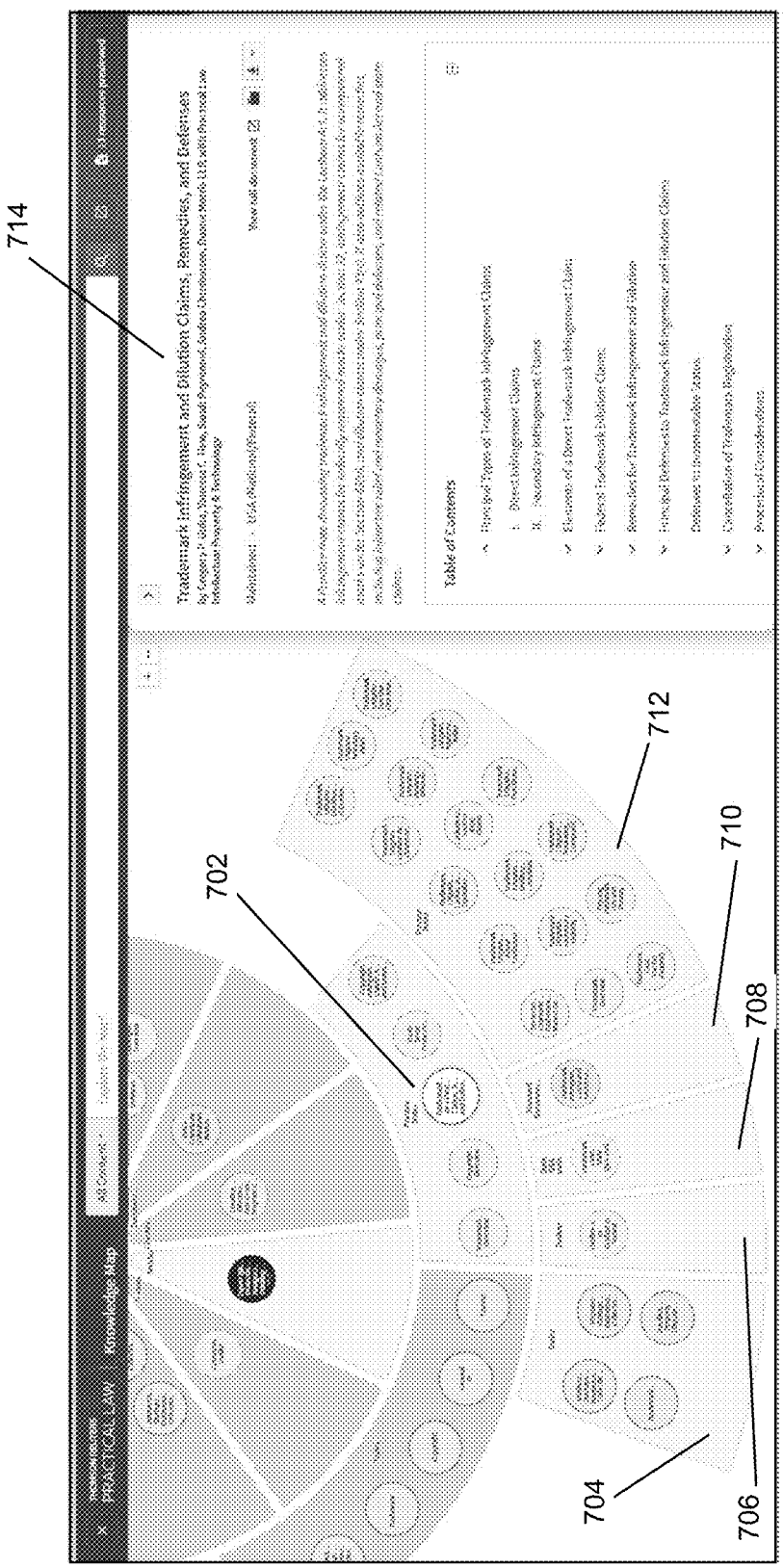
Figure 8:
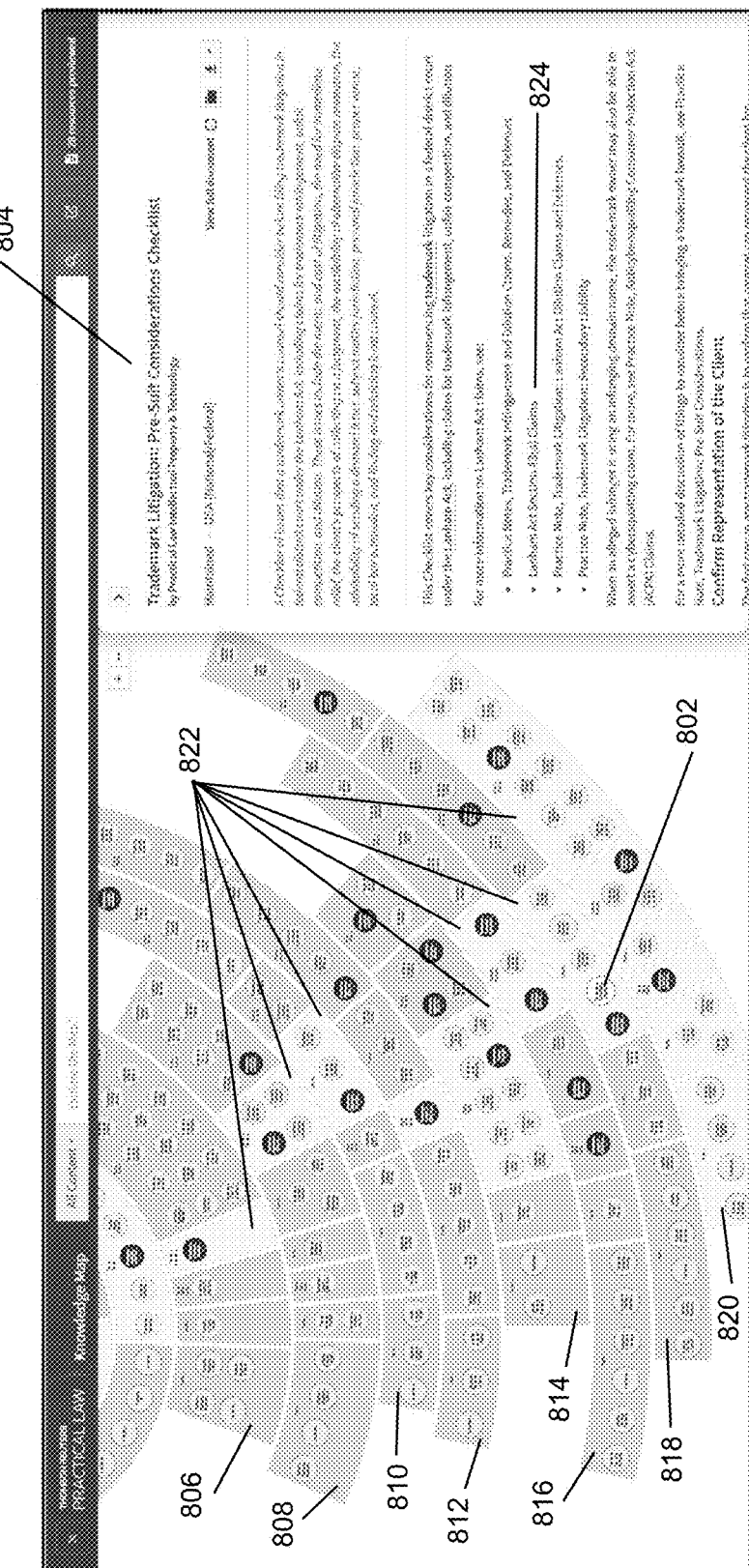
Figure 9:
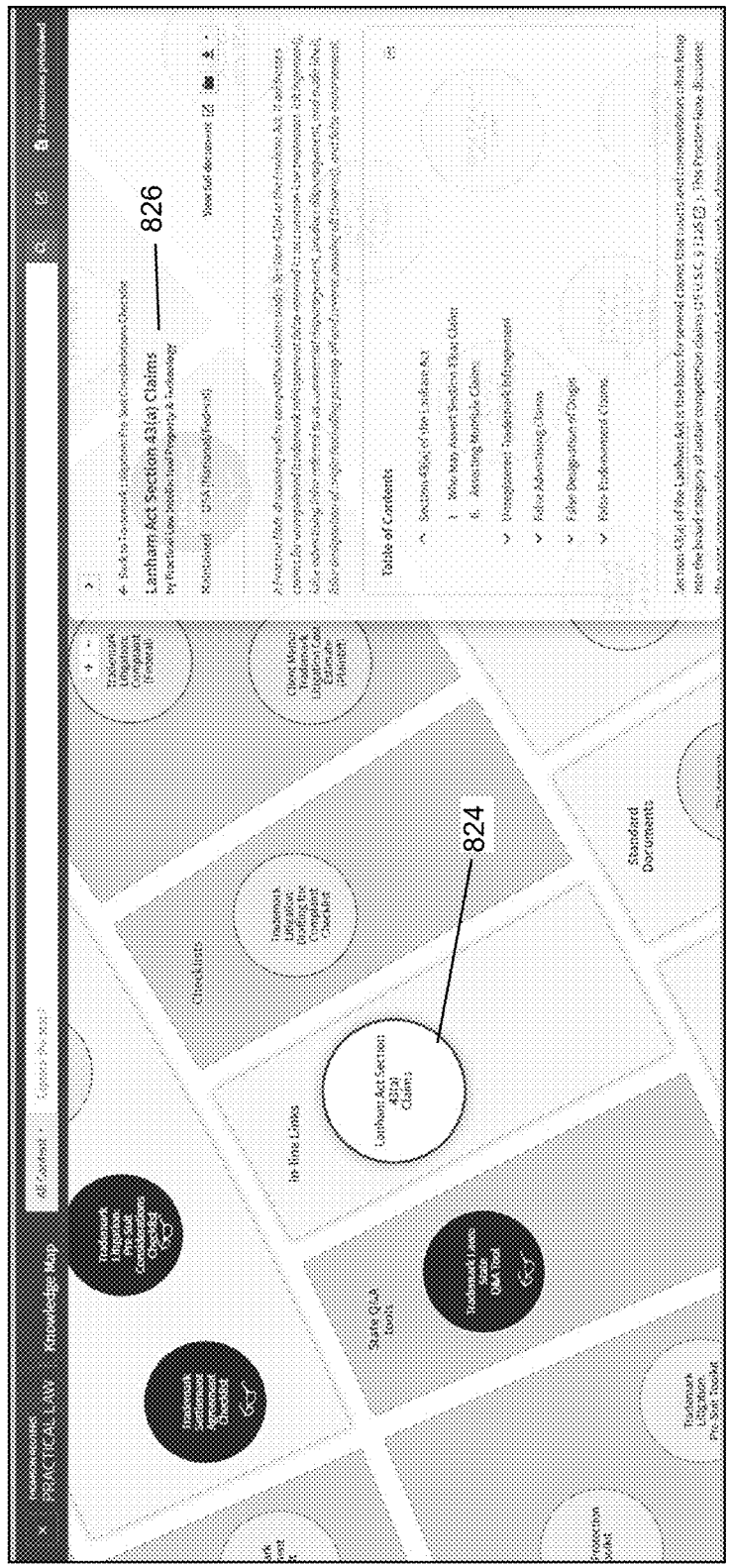

FIG. 7 shows a third level object 702 selected and the map expanded to include fourth level segments 704-712. The map is preferably infinitely scalable, and the segmented rings are preferably concentrically located about the first level object. The navigation path is similarly shown in a brighter color with the selected object and expanded fourth level segment in view. In this instance too, the fourth level segments include resource types in common with the second and third level segments, including topics 704 and practice notes 712, and the trademark object in common. FIG. 8, for example, shows a map expanded to show ten levels of segments 806-820, with the segments that make up the navigation path 822 in contrasting colors as discussed herein. The content window depicts the content 804 associated with the selected tenth level object 802. A given content item may include therein links to other objects. For example, the selected object 802 content may include a link 824 to another object, which if selected causes the map to refocus on the selected object link 824, as shown in FIG. 9, with the associated content 826 displayed in the content window. The selected object may be in the same or different segment levels as that of the object from which the navigation originates. In other words, link navigation may place the focus on an object on the map in any direction.

Figure 10:
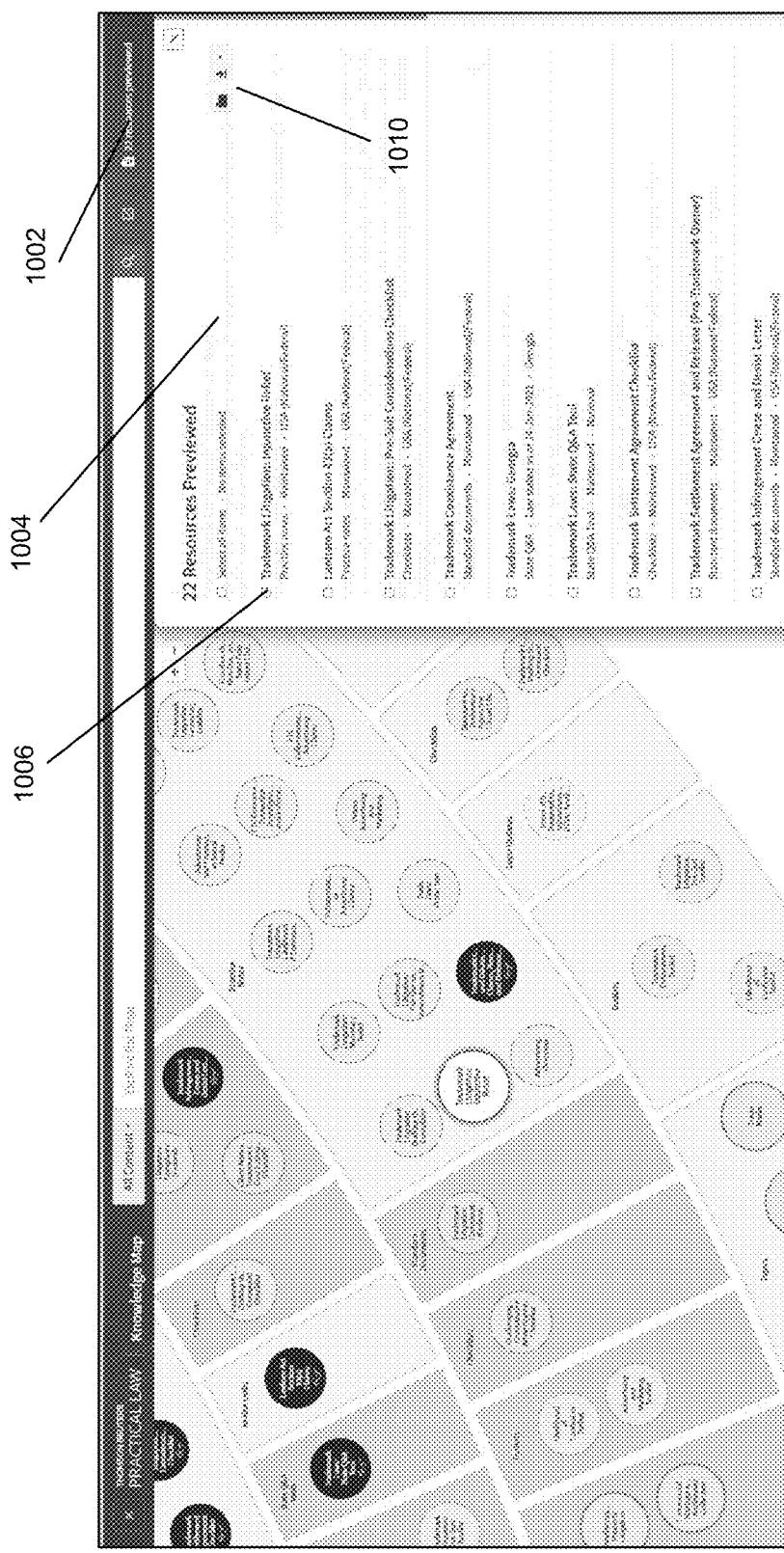

Referring to FIG. 10, as discussed herein, user navigation history may be tracked for navigation to previously visited objects, segments, or entire maps. This may be achieved in a variety of ways. In one embodiment, the interface screen includes a button or other form element 1002 for users to retrieve navigation history. In response thereto, the interface retrieves the user's history and displays a selectable list of resources viewed 1004. Users can revisit the objects on the map by selecting any one of the listed items. The items on the list may also include a checkbox or other form element for the user to download 1010 the items visited in a single or multiple actions.

Figure 11:
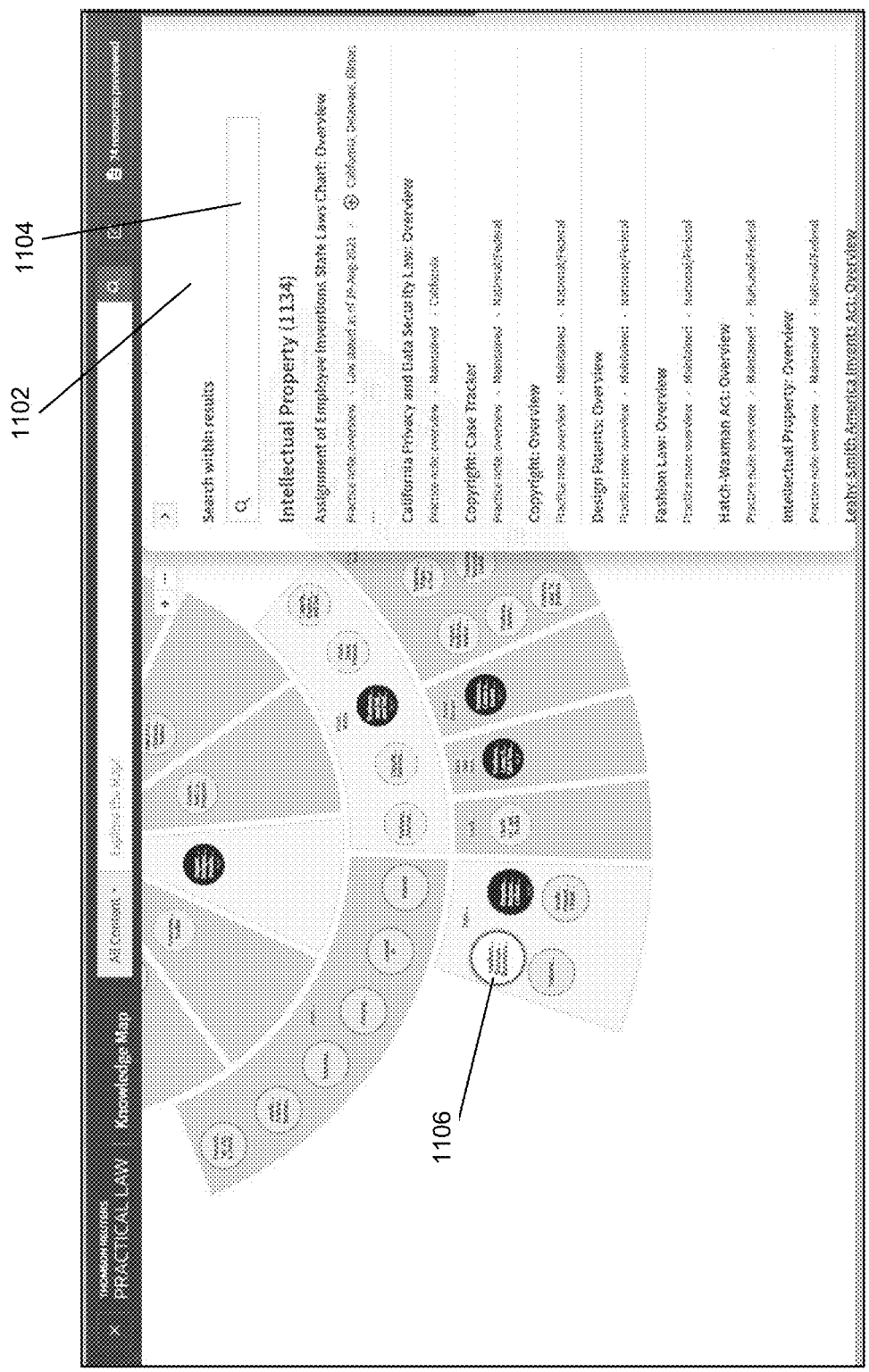

Referring to FIG. 11, the interface preferably enables users to search content within a selected segment and/or object. For example, a search window 1102 may be displayed which may include a text box 1104 or other form elements for users to search content associated with the selected object 1106. As discussed above, an object may be associated with more than one segment on the map. The search results may therefore be a node anywhere on the map and/or a link to a content item.

Figure 12:
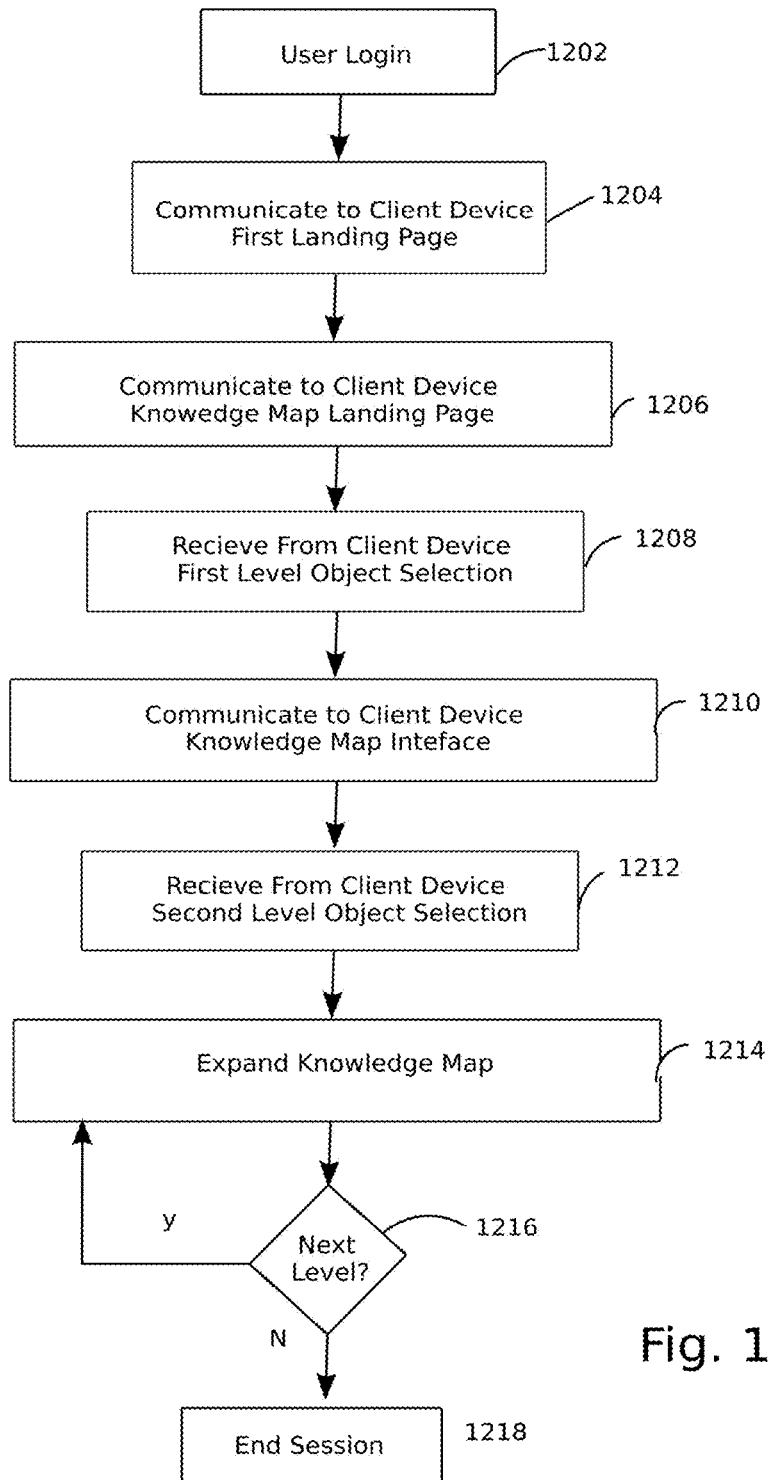
FIG. 12 a block diagram of a method for the computer assisted research according to at least one embodiment of the methods disclosed herein.

Referring to FIG. 12, a method for computer assisted research may begin with a user logging into the platform at 1202. In response to a successful login, the system may communicate to the user a first landing page at 1204, such as the knowledge management system landing page shown in FIG. 2. The first landing page provides various tools for users to navigate the various resources maintained by the platform. Preferably, the system provides a selectable icon on the first landing page for users to access certain research tools, including a knowledge map tool. The system, in response to a user selecting the knowledge map tool, communicates to the user a second landing screen at 1206, such as the knowledge map landing screens shown in FIGS. 3 and 4A-4B.

The knowledge map landing screen preferably includes therein form elements for users to display at the client device a map view of resource objects associated with a first level object. As discussed above, the first level object may be selected by the user returning to a previous research session. Similarly, the user may initiate a new research session by selecting an object from a list presented to the user by the system in response to a query. In either event, the client device communicates to the system and the system receives from the client device at 1208 a selection of a first level object. In response, the system communicates to the client device for display thereon a map window that includes therein the selected first level object centrally located in the map window. The map window preferably displays the first level object in a nuclear design with a plurality of second level objects disposed in a segmented ring surrounding the first level object, as shown in FIG. 5. The segments preferably correspond to one of a plurality of resource types, such as topics, practice notes, standard documents, checklists, articles, and toolkits. As discussed above, the map interface includes code that configures the interface and therefore the client device that executes the code to asynchronously communicate information back and forth between the system and client devices without the need for refreshing the browser window at the client device.

The code preferably centers and/or resets the zoom with respect to the map elements in the map window so that users can observe the entirety of the first level object and the second level segments. The code preferably also provides users with the capability of panning (dragging) and zooming in and out of the map view. The knowledge map interface screen preferably includes a content viewer window, which displays the content associated with the selected object. In this regard, the client device retrieves from the system and the system communicates content associated with the selected object to the client device for display thereon. In the example above, the selection of the "3d Printing: Overview" object results in the client device retrieving from the system and displaying at the client device the content associated with the selected object. The color or shading of the objects and/or segments displayed on the map may be coordinated to provide a visual indication of the user's navigation path. As such, the client side code may toggle the color of the displayed elements, including the resource object and one or more of the segments, to indicate the status of the item relative to the navigation state of the map. For example, the code may, in response to the selection of a given item, change the color or hue of the item to indicate, for example, which of the objects or segmented rings are in focus, which objects have been previously visited, etc.

Each of the second level objects are preferably selectable to expand the map beyond the second level segments. Accordingly, the system may receive from the client device at 1212 a selection of a second level object and in response to the user selection, the system may communicate to the client device at 1214 information for expanding the map to include third level segment ring with selectable third level objects in response thereto, as shown in FIG. 6. The third level objects are related to the selected second level object, as discussed above. The second level segments may similarly include segments that segregate third level by resource type, such as one or more of topics, practice notes, standard documents, checklists, articles, and toolkits. In one embodiment, the second and third level segments include resource types in common. In another embodiment, segments on two or more different levels include a common resource object. When the selected object includes a plurality of content items, a list of the content items may be presented in the content window that allows the user to select and view the content items in the same or a separate window. As discussed above, the client device automatically recenters and resets the zoom for the expanded map to display at least the selected object and the next level segments in view. The process of expanding the map in response to a selection of a given object item may be repeated at 1216 as shown in FIG. 7 until the user ends the session at 1218.

As discussed above in relation to FIG. 8, the content items may include links for navigating to objects on the map in response to the user selection of a given link. As such, client side code may cause the map view to refocus on the selected object link and expand the map view accordingly. The selected object may be in the same or different segment levels as that of the object from which the navigation originates. In other words, link navigation may occur on the map in any direction. User history may be tracked, in which instance the client device may navigate on the map to previously visited objects by selecting a link in the user's navigation history.

While the foregoing invention has been described in some detail for purposes of clarity and understanding, it will be appreciated by one skilled in the art, from a reading of the disclosure, that various changes in form and detail can be made without departing from the true scope of the invention.

What is claimed is:

1. A method for computer assisted research, comprising:
   receiving, by a computing device, a selection of a first level object from a plurality of first level objects;
   causing to be displayed, by the computing device, in response to the selection of the first level object, an interface screen comprising the selected first level object and a plurality of second level objects related to the first level object, the plurality of selectable second level objects arranged in a first segmented ring around the selected first level object, the plurality of selectable second level objects comprising a first resource object, a second resource object, and a third resource object;
   expanding, by the computing device, the interface screen in response to a selection of the first resource object to include a first set of third level objects arranged in a second segmented ring around the first resource object and around the first segmented ring; and
   expanding, by the computing device, the interface screen in response to a selection of the second resource object to include a second set of third level objects arranged in third a segmented ring around the first resource object and around the first segmented ring, wherein the first set of third level objects include at least one resource object that is not included in the second set of resource objects; and
      causing to be displayed, by the computing device, a colored-shaded resource object visually indicating a user's focus; and
      causing to be displayed, by the computing device, a search interface object restricted to search within the user's focus.

2. The method of claim 1, wherein the interface screen is infinitely scalable.

3. The method of claim 1, wherein each of the third level objects are selectable, the method further comprising expanding, by the computing device, the interface screen in response to a selection of a second level object to include a plurality of fourth level objects arranged in a segmented ring around the first level object and around the segmented rings of second and third level objects;
   causing to be displayed, by the computing device, a knowledge map landing screen providing a map view of the first, second and third resource objects; wherein the knowledge map landing screen is zoomable and pannable.

4. The method of claim 3, wherein the segmented rings are implemented in a circular design with the segmented rings of the second and third level objects arranged concentrically about the first level object.

5. The method of claim 1, wherein the objects each relate to a knowledge resource.

6. The method of claim 5, wherein the first segmented ring comprises a plurality of segments each relating to a different type of resource, wherein the first set of resource objects are displayed in a first segment and the second set of resource object are displayed in a second segment adjacent to the first segment.

7. The method of claim 6, wherein the plurality of segments relate to at least two types of resources selected from a group consisting of topics, practice notes, standard documents, checklists, articles, and toolkits.

8. The method of claim 1, the interface comprises a form element for users to enter query terms and a query results window, the method further comprising
   retrieving, by the computing device, search results based on query terms;
   displaying the search results in the query result window, wherein at least one of the search results includes a selectable link associated with the third resource object; and, in response to selection of the third resource object link, displaying content associated with the third resource object in a content window and expanding the interface screen to include a third set of third level objects arranged in a third segmented ring around the third resource object and around the first segmented ring.

9. The method of claim 8, wherein the search results related to the first, second, and third resource objects.

10. The method of claim 1, the method further comprising expanding, by the computing device, zooming in in the interface screen so that the entirety of the selected second level object and the segmented ring associated with the third level objects are displayed.

11. The method of claim 1, comprising expanding, by the computing device, displaying a segment associated with the selected second level object and the segmented ring associated with the third level objects in a contrasting color to indicate navigation path.

12. The method of claim 1, comprising displaying content associated with the selected second level object in a content window.

13. The method of claim 12, wherein the content associated with the selected second level object comprises at least one link to an object displayed on the interface screen, the method further comprising receiving a selection of the at least one link, navigating to the object associated with at least one link, and displaying content associated with the selected link.

14. The method of claim 13, comprising refocusing the interface screen onto the object associated with the at least one link.

15. The method of claim 1, wherein the second level objects and the third level objects share at least one resource object in common.

16. The method of claim 1, wherein the segmented ring around the second level objects and the third level objects each comprise a plurality of segments each relating to a resource type and wherein at least one of the plurality of segments associated with the second level objects and at least one of the plurality of segments associated with the third level objects share at a resource type in common.

* * * * *